US012647762B2

(12) United States Patent
Salahshour

(10) Patent No.: US 12,647,762 B2
(45) Date of Patent: Jun. 2, 2026

(54) EMERGENCY COMMUNICATION SYSTEM

(71) Applicant: Chad Salahshour, Chagrin Falls, OH (US)

(72) Inventor: Chad Salahshour, Chagrin Falls, OH (US)

(73) Assignee: 911 Cellular LLC, Beachwood, OH (US)

( * ) Notice: Subject to any disclaimer, the term of this patent is extended or adjusted under 35 U.S.C. 154(b) by 605 days.

(21) Appl. No.: 18/179,577

(22) Filed: Mar. 7, 2023

(65) Prior Publication Data

US 2024/0305967 A1     Sep. 12, 2024

(51) Int. Cl.
*H04W 4/90*          (2018.01)

(52) U.S. Cl.
CPC ..................................... *H04W 4/90* (2018.02)

(58) Field of Classification Search
CPC ....................................................... H04W 4/90
USPC ..................................................... 455/404.1
See application file for complete search history.

(56) References Cited

U.S. PATENT DOCUMENTS

| | | | |
|---|---|---|---|
| 10,599,101 B2 * | 3/2020 | Rothkopf | ............. G04G 21/025 |
| 10,909,830 B1 * | 2/2021 | Stapleford | ............. H04W 4/90 |
| 11,116,448 B1 * | 9/2021 | Trapero Martin | ... A61B 5/0816 |
| 2009/0173613 A1 * | 7/2009 | Geldmacher | ...... G07C 9/00944 |
| | | | 200/341 |
| 2015/0038109 A1 | 2/2015 | Salahshour | |
| 2017/0192745 A1 * | 7/2017 | Sunstrum | ................ H04W 4/80 |
| 2019/0385438 A1 * | 12/2019 | Cholhan | ................. H04W 4/90 |

* cited by examiner

*Primary Examiner* — Michael R Neff
(74) *Attorney, Agent, or Firm* — Taft Stettinius & Hollister LLP

(57)          ABSTRACT

An emergency communication system that includes an emergency communication badge that is configured to be coupled to a user of the emergency communication badge. The emergency communication badge can include a haptic feedback device, a first input body, a microphone, a communication unit, a processor(s), and a memory device that is coupled to the processor. In response to detection of an activation of the first input body, the communication unit can be instructed to wirelessly transmit an activation signal from the emergency communication badge, and the microphone can be operated for a predetermined time period. Additionally, in response to a receipt by the communication unit of a receipt signal acknowledging at least the detection of the transmitted activation signal, including acknowledgment from a website of a remote system, the haptic feedback device can be activated. Further, during the predetermined time period, sounds captured by the microphone can be streamed.

19 Claims, 7 Drawing Sheets

FIG. 5

EMERGENCY COMMUNICATION SYSTEM

TECHNICAL FIELD

The present disclosure generally relates to an emergency communication system, and more particularly, but not exclusively, to an emergency communication system that utilizes an emergency badge that can transmit a communication that can both indicate an emergency situation and be used to identify a location of the badge.

BACKGROUND

In times of actual, potential, or developing emergencies, an individual may seek the assistance of emergency responders, including, for example, police, firefighters, and/or paramedics, among other emergency responders. For example, in such situations, a person may call a call center, including, for example, an emergency call center associated with an individual dialing 911 on a phone. However, in at least certain situations, time may be of the essence. Thus, the time taken to connect with such a call center, as well as effectively communicate the situation while under the pressure of the current circumstances, can be detrimental to remediating a current or developing emergency situation. Further, such an approach is dependent, at least in part, on an individual being able to gain access, and use, an operating phone. Moreover, with respect to certain types of emergencies, an individual may be unable to safely and/or timely access a phone, let alone discretely make contact with a call center. Such accessibility problems can also be similarly encountered by emergency communication units that may be mounted at specific locations, including, for example, mounted at a static position on a wall of a room or building.

SUMMARY

The present disclosure may comprise one or more of the following features and combinations thereof.

In one embodiment of the present disclosure, an emergency communication badge is provided that can be configured to be coupled to a user of the emergency communication badge. The emergency communication badge can include a haptic feedback device, a first input body, a microphone, a communication unit, at least one processor, and a memory device that is coupled to the at least one processor. Additionally, the memory device can include instructions that when executed by the at least one processor can cause the at least one processor to detect an activation of the first input body, and instruct, in response to detection of the activation of the first input body, the communication unit to wirelessly transmit an activation signal from the emergency communication badge. Further, the memory device can include instructions that when executed by the at least one processor can cause the at least one processor to activate, in response to the detection of the activation of the first input body, and for a predetermined time period, operation of the microphone, and instruct, in response to a receipt by the communication unit of a receipt signal corresponding to an acknowledgement of a detection of the activation signal that was wirelessly transmitted from the emergency communication badge, activation of the haptic feedback device. The memory device can also include instructions that when executed by the at least one processor can cause the at least one processor to instruct the communication unit to stream, during the predetermined time period, an audio data signal, the audio data signal including data of sounds captured by the microphone during the predetermined time period.

These and other features of the present disclosure will become more apparent from the following description of the illustrative embodiments.

BRIEF DESCRIPTION OF THE FIGURES

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIGS. 4 and 5 illustrate top and bottom side exploded perspective views, respectively, of the emergency communication badge with the upper cover and an inner membrane removed.

DETAILED DESCRIPTION OF THE ILLUSTRATIVE EMBODIMENTS

Figure 1:
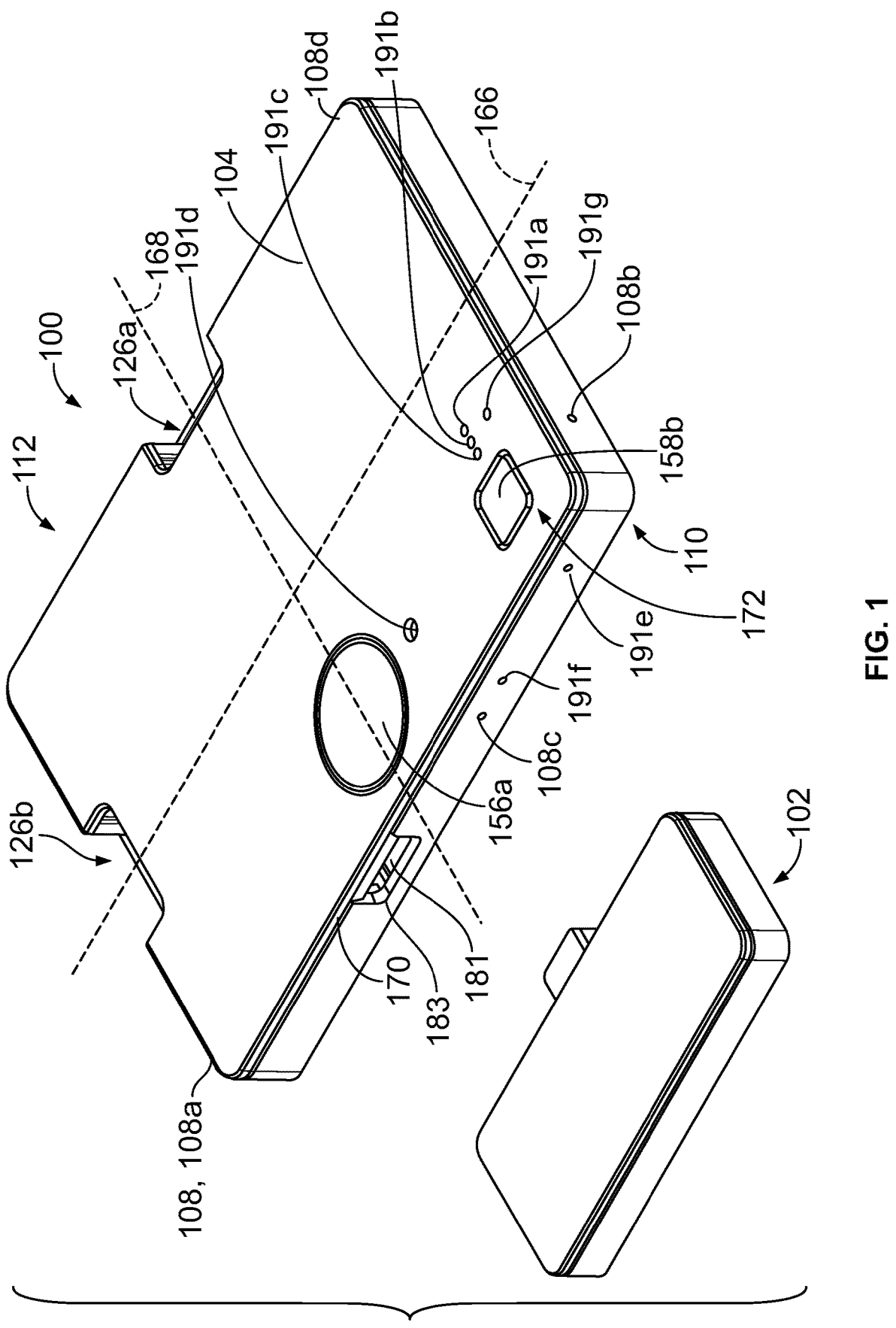
FIG. 1 illustrates a top side perspective view of an exemplary emergency communication badge and an optional supplemental power supply.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C).

Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

A number of features described below may be illustrated in the drawings in phantom. Depiction of certain features in phantom is intended to convey that those features may be hidden or present in one or more embodiments, while not necessarily present in other embodiments. Additionally, in the one or more embodiments in which those features may be present, illustration of the features in phantom is intended to convey that the features may have location(s) and/or position(s) different from the locations(s) and/or position(s) shown.

Figures 2, 3:
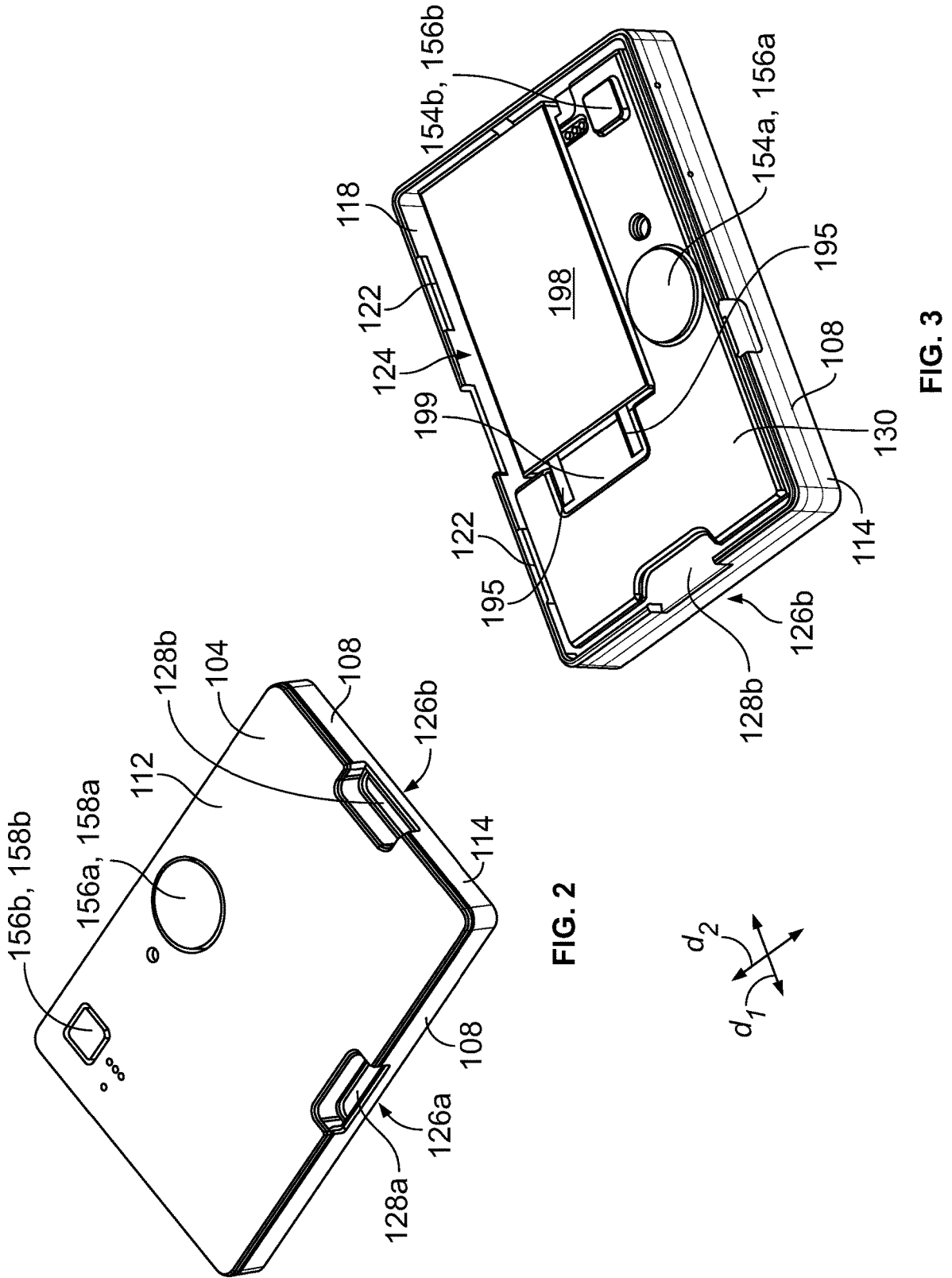
FIG. 2 illustrates another top side perspective view of the emergency communication badge.
FIG. 3 illustrates a top side perspective view of the emergency communication badge with an upper cover removed.

FIGS. 1 and 2 illustrate perspective views of an exemplary emergency communication badge 100, with FIG. 1 also including a depiction of an optional exemplary supplemental power supply 102. The emergency communication badge 100 has a top wall 104, an opposing bottom wall 106, and sidewall 108 that is positioned between the top and bottom walls 104, 106. The sidewall 108 can generally define an outer side periphery of the emergency communication badge 100.

Figure 4:
Figure 5:
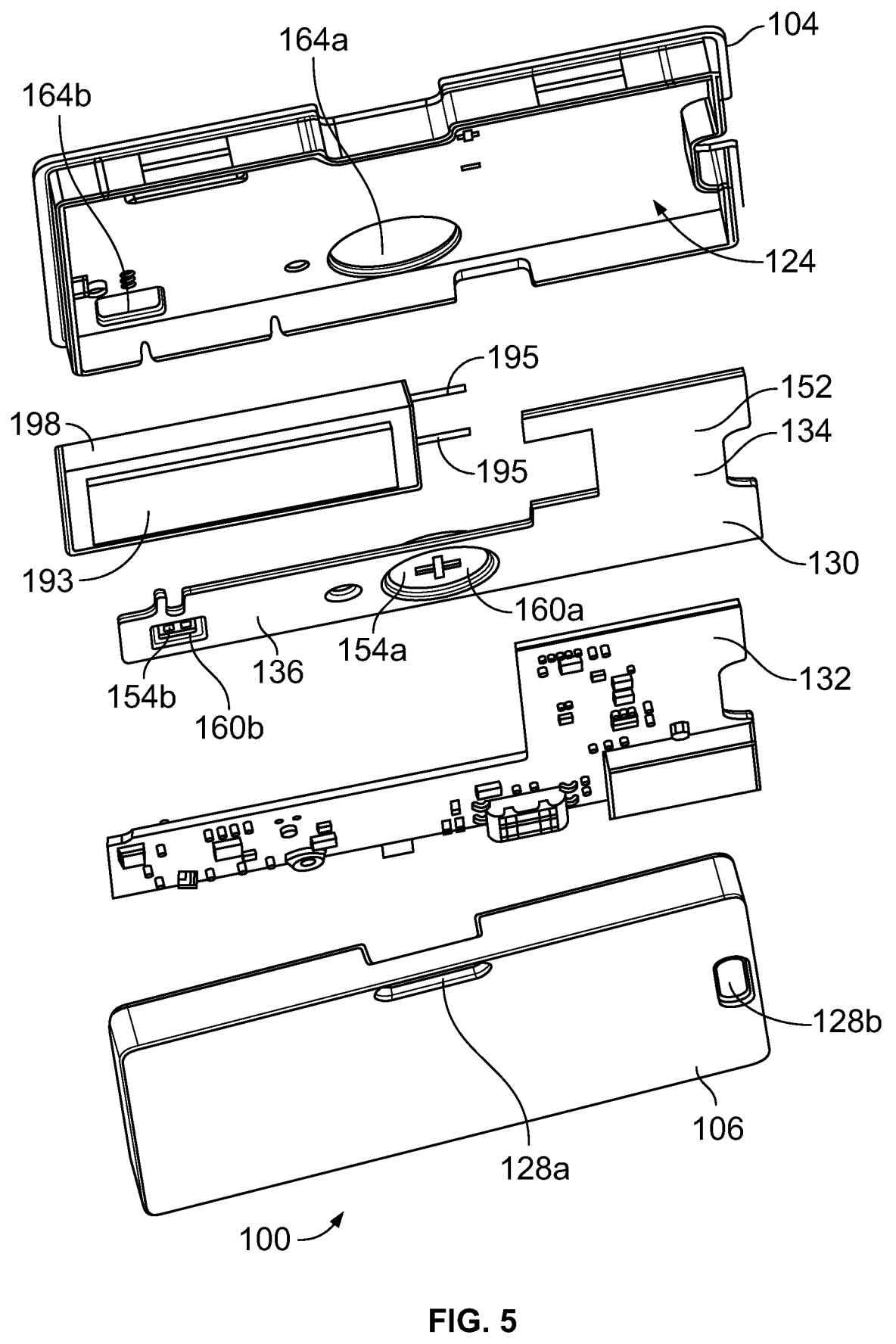

According to certain embodiments, the emergency communication badge 100 includes a cover assembly 110 having an upper cover 112 that includes the top wall 104, and a lower cover 114 that includes the bottom wall 106. The cover assembly 110 can be constructed from a variety of materials, including, but not limited to, plastic. Further, the cover assembly 110 can provide protective shell for other portions of the emergency communication badge 100, and may be generally rigid. As seen in at least FIGS. 4 and 5, one of the upper cover 112 and the lower cover 114 can include an inner sidewall 116, while the other of the upper cover 112 and the lower cover 114 can include an outer sidewall 118. Further, the outer sidewall 118 or a combination of the outer sidewall 118 and the inner sidewall 116 can provide the sidewall 108 of the emergency communication badge 100. As also shown in FIGS. 4 and 5, according to the illustrated embodiment, the inner sidewall 116 can downwardly extend from the top wall 104 of the upper cover 112, while the outer sidewall 118 can upwardly extend from the bottom wall 106 of the lower cover 114. Further, the outer sidewall 118 can be sized to receive placement of the inner sidewall 116 within an inner perimeter of the outer sidewall 118. Thus, for example, when the cover assembly 110 is assembled, an outer side of the inner sidewall 116 can be generally adjacent to, and possibly in contact with, an adjacent inner side of the outer sidewall 118. Additionally, one or both of the outer sidewall 118 and the inner sidewall 116 can include one or more tabs 120 that can be matingly received in an adjacent aperture 122 in the other of the outer sidewall 118 and the inner sidewall 116. During assembly of the cover assembly 110, as the inner sidewall 116 is being displaced relative to the outer sidewall 118, at least a portion of the tab(s) 120 can be inwardly bent, deformed, or deflected until the tab(s) 120 is/are at a position to be received in the mating aperture 122.

When in the tab(s) 120 is/are positioned in the mating aperture 122, the tab(s) 120 can provide a force, resistance, or barrier to prevent separation of the upper cover 112 from the lower cover 114.

The cover assembly 110 can have a variety of shapes and sizes, including, for example, being regularly rectangular. Additionally, the upper and lower covers 112, 114 can generally define an interior area 124 of the communication badge 100, at least portion of which is seen in FIG. 3. Thus, according to the illustrated embodiment, the interior area 124 is at least partially, if not entirely, enclosed by the upper and lower covers 112, 114.

According to certain embodiments, the cover assembly 110 can be adapted to include, and/or be coupled to, a substrate that includes, identification information. For example, according to certain embodiments, one or more pictures, images, letters, codes, and/or numbers that provide identification information can be printed, engraved, and/or molded onto/into the top wall 104, bottom wall 106, and/or sidewall 108. Alternatively, or additionally, a substrate containing such information can be coupled to the top wall 104, bottom wall 106, and/or sidewall 108, such as, for example via an adhesive or lamination, among other manners of attachment. Further, according to other embodiments, the cover assembly 110 can be coupled to a generally transparent sheet, including, for example, a sheet of plastic, that may be at least partially separable from a portion of the cover assembly 110 so as to provide a pocket or recess between the cover assembly 110 and the sheet. According to such an embodiment, the pocket or recess between the cover assembly 110 and the sheet can provide an area for the selective placement and retention of identification information, including, for example, an identification card. Thus, according to certain embodiments, the emergency communication badge 100 can be utilized for purposes of identification, including employee identification, among other uses, as discussed below. Alternatively, according to other embodiments, the emergency communication badge 100 can be distinct from other identification information, or can provide supplemental identification separate from more traditional forms of identification, such as employee or student identification badges or cards, among other forms of identification.

As seen in at least FIGS. 1 and 2, according to certain embodiments, the emergency communication badge 100 can include one or more attachment bodies 126a, 126b that are sized to receive, or be engaged by, another item or device that can be utilized to attach the badge 100 at least to a person or article, such as clothing, being worn, carried, or on a person. According to the illustrated embodiment, the attachment bodies 126a, 126b are at least partially defined by the upper and lower covers 112, 114 such that the attachment bodies 126a, 126b provide one or more through holes or slots 128a, 128b that extend through at least, the cover assembly 110. According to the illustrated embodiment, the slots 128a, 128b are at least partially inwardly offset from the sidewall 108.

Additionally, according to certain embodiments, one or more of the attachment bodies 126a, 126b is/are sized to accommodate passage of a lanyard that can be worn around a neck or other portion of a person, and/or can accommodate passage there-through of a key chain ring, hook, or clip, among other items. According to the illustrated embodiment, the slots 128a, 128b are at least partially inwardly offset from the sidewall 108. Additionally, while the attachment bodies 126a, 126b are shown as having generally similar cross-sectional shapes, namely rectangular, and similar sizes, the attachment bodies 126a, 126b can have different shapes and/or sizes so as to accommodate coupling the badge 100 to different types of devices or components.

FIG. 3 illustrates a top side perspective view of the emergency communication badge 100 with the upper cover 112 removed. As seen, an inner membrane 130 can be positioned above, and have a shape that is at least generally similar to, at least a portion of an opposing upper surface of a printed circuit board 132 (PCB 132) (FIG. 5) of the emergency communication badge 100. The inner membrane 130 can be constructed from a variety of relatively flexible materials, including, but not limited, to, silicone. According to certain embodiments, the inner membrane 130 can have a membrane base portion 134 and a membrane extension portion 136. The membrane base portion 134 can extend in a first direction (as generally indicate by "$d_1$" in FIG. 3) from a first sidewall 138 of the inner membrane 130 to an membrane inner sidewall 140, The membrane extension portion 136 can generally extend in the first direction from the membrane inner sidewall 140 to a second sidewall 142 of the inner membrane 130. The first and second sidewalls 138, 142 can be generally parallel to each other and positioned at opposing sides of the inner membrane 130. Further, according to the illustrated embodiment, the membrane extension portion 136 can have a first size, such as a width, in the first direction that is larger than a corresponding first size, or width, of the membrane base portion 134 in the first direction. Additionally, the membrane base portion 134 can generally extend in a second direction (as generally indicated by "$d_2$" in FIG. 3) between opposing third and fourth sidewalls 144, 146 of the inner membrane 130, the third and fourth sidewalls 144, 146 being generally orthogonal to the first and second sidewalls 138, 142. Similarly, the membrane extension portion 136 can generally extend from the third sidewall 144 in the second direction to an intermediate wall 148 of the inner membrane 130. The intermediate wall 148 can be generally parallel to, and positioned between, the third and fourth sidewalls 144, 146. Thus, the membrane base portion 134 can, in the second direction, have a second size, such as, for example, a height, that is larger than a corresponding second size, or height, of the membrane extension portion 136. Further, the above-mentioned first direction ($d_1$) can be generally orthogonal to the second direction ($d_2$).

The inner membrane 130 can have a thickness between an upper wall 150 and an opposing lower wall 152 (FIG. 5) of the inner membrane 130. Additionally, the inner membrane 130 can include one or more one or more upwardly projecting protrusions 154a, 154b that extend above the upper wall 150. The protrusions 154a, 154b can provide at least portions of input bodies 156a, 156b for the emergency communication badge 100 that can be utilized, for example in connection with the set-up and/or operation of the emergency communication badge 100, as discussed below. The upper cover 112 can include one or more openings 164a, 164b that can provide external access to at least an upper surface 158a, 158b of the protrusions 154a, 154b. Moreover, the openings 164a, 164b can be sized such that a digit of a user can engage and depress the protrusions 154a, 154b in connection with activating the associated input body 156a, 156b.

According to the illustrated embodiment, the upper surface 158a, 158b of each of the one or more upwardly projecting protrusions 154a, 154b can extend along a first plane that is vertically offset from, but is generally parallel to, a second plane along which at least a portion of the upper wall 150 of the inner membrane 130 extends. Additionally, according to certain embodiments, the upper surface 158a, 158b of the one or more upwardly projecting protrusions 154a, 154b can be generally coplanar with the top wall 104 of the upper cover 112, or otherwise be at a vertical height that is slightly vertically above or below the top wall 104 of the upper cover 112 to an extent that can prevent incidental depression of the protrusions 154a, 154b, and thus of the associated input bodies 156a, 156b.

As seen in at least in FIG. 5, the underside of the protrusions 154a, 154b, and moreover at least the opposing portion of the inner membrane 130 directly beneath the upper surfaces 158a, 158b of the protrusions 154a, 154b, can be configured to provide recesses 160a, 160b that can house at least portions of the switches 162a, 162b (FIG. 5) of the associated input bodies 156a, 156b. The switches 162a, 162b can be positioned on, and electrically coupled to, the PCB 132. While a variety of different types of switches can be utilized as switches 162a, 162b for the emergency communication badge 100, according to certain embodiments one or more of the switches 162a, 162b are dome switches.

The protrusions 154a, 154b, and the corresponding openings 164a, 164b in the cover assembly 110, can have a variety of different shapes and sizes, including, but not limited to, circular, oval, square, and rectangular cross-sectional shapes. Further, at least one of the input bodies 156a, 156b can be larger than the other input body 156a, 156b. For example, in the illustrated embodiment, a first, emergency input body 156a is larger, such as, for example, has an outer diameter, than is larger than a corresponding size of a second input body 156b. Further, compared to the second, configuration input body 156b, the first, emergency input body 156a can be at a generally central location along at least a portion of the emergency communication badge 100. For example, as seen in at least FIG. 1, according to certain embodiments, the emergency communication badge 100 can include a first, longitudinal axis 166 that is parallel to, and positioned at a midsection between, the opposing first and sidewalls 108a, 108b of the emergency communication badge 100, and a second axis 168 that is parallel to, and positioned at a midsection between, opposing third and fourth sidewalls 108c, 108d of the emergency communication badge 100. Further, the second axis 168 can be generally perpendicular to the first axis 166. According to the illustrated embodiment, the first, emergency input body 156a, which can be a first, depressible button, can generally be aligned with the second axis 168 and offset from the first axis 166 such that the first input body 156a is positioned at a central location along or adjacent to an edge 170 of the top wall 104. Unlike the larger first input body 156a, the smaller second, configuration input body 156b which can be a second, depressible button can be offset from both the first axis 166 and the second axis 168, and generally be positioned in or around a corner 172 of the top wall 104.

As previously mentioned, the PCB 132 can have an overall shape that is generally similar to that discussed above with respect to the inner membrane 130. Thus, for example, the PCB 132 can have a PCB base portion 174 and a PCB extension portion 176. The PCB base portion 174 can extend in the first direction ($d_1$) from a first sidewall 178 of the PCB 132 to PCB inner sidewall 116. The PCB extension portion 176 can generally extend in the first direction from the PCB inner sidewall 180 to a second sidewall 182 of the PCB 132, the first and second PCB sidewalls 178, 182 being generally parallel to each other and positioned at opposing sides of the PCB 132. Further, according to the illustrated embodiment, the PCB extension portion 176 can have a first size, such as a width, in the first direction that is larger than a corresponding first size, or width, of the PCB base portion 174 in the first direction. Additionally, the PCB base portion 174 can generally extend in the second direction ($d_2$) between opposing third and fourth sidewalls 184, 186 of the PCB 132, the third and fourth sidewalls 184, 186 being generally orthogonal to the first and second sidewalls 178, 182. Similarly, the PCB extension portion 176 can generally extend from the third sidewall 184 in the second direction to a PCB intermediate wall 188 of the PCB 132 that is generally parallel to, and positioned between, the third and fourth sidewalls 184, 186. Thus, the PCB base portion 174 can have a second size, such as, for example, a height, in the second direction that is larger than a corresponding second size, or height, of the PCB extension portion 176. Further, the above-mentioned first direction ($d_1$) can be generally orthogonal to the second direction ($d_2$).

The PCB 132 can be secured to either or both the upper and lower covers 112, 114. For example, according to the illustrated embodiments, the PCB 132 can be secured to the lower cover 114 via one or more mechanical fasteners, including, but not limited to, screws, or via one or more tabs that may matingly engage a mating aperture, such as, for example, via a snap fit.

The PCB 132 can be placed within and/or upon one or more support walls 190 that is/are positioned within the associated inner or outer sidewall 116, 118. According to certain embodiments, the support walls 190 can elevate the PCB 132 above an inner surface 192 of the bottom wall 106 so at to provide a cavity 194 therebetween. The cavity 194 can be sized to house at least a portion of a haptic feedback device 196, including, for example, a haptic motor. The haptic feedback device 196 is configured to provide a vibration or vibratory forces to the emergency communication badge 100, and thus to a user in possession or in physical contact with the emergency communication badge 100. The haptic feedback device 196 can be electrically coupled to the PCB 132, such as, for example, via one or more terminals 197a, 197b.

The inner membrane 130, PCB 132, and a portion of inner sidewall 116 of the cover assembly 110 can generally define an aperture 199 within the interior area 124 for placement of a battery 198. According to the illustrated embodiment, the outer perimeter of the aperture 199 can generally be defined by the inner walls 140, 180 and intermediate walls 148, 188 of the inner membrane 130 and PCB 132, and a portion of the inner sidewall 116 of the cover assembly 110. Further, the inner walls 140, 180 can be generally orthogonal to the intermediate walls 148, 188 of the inner membrane 130 and PCB 132, respectively. The battery 198 can include a pair of contacts 195 that can be electrically coupled to the PCB 132. Additionally, the battery 198 can be adhered to one or both of the upper cover 112 and lower cover 114 in a variety of manners, including, for example, an adhesive 193, such as, but not limited to, an adhesive tape or foam. While a variety of different types of rechargeable batteries having different capacities can be utilized, according to certain embodiments the battery 198 is a rechargeable battery that can generally operate the emergency communication badge 100 for approximately thirty days between charges.

In addition to openings 164a, 164b for the protrusions 154a, 154b, or input bodies 156a, 156b, the top wall 104 of the upper cover 112 of the emergency communication badge 100, or other portions of the cover assembly 110, can include one or more apertures 191a-g. According to certain embodiments, one or more of the apertures 191a-c are positioned to provide a pathway for light that is emitted from one or more lights 189a-c that are positioned within the interior area 124, including, for example, light emitting diodes that are coupled to and positioned on the PCB 132. The lights 189a-c can be used to communicate information regarding the operation of the emergency communication badge 100, and/or to visually communicate information to a user of the emergency communication badge 100, as discussed below. Additionally, or optionally, according to certain embodiments, one or more apertures 191d-f can be positioned to accommodate the passage of sound waves through the aperture 191d-f and to a microphone 187 that is within the interior area 124 and is electrically coupled to the PCB 132. Further, according to certain embodiments, one or more apertures 191g can provide visual access to a camera 185 that may also be coupled to the PCB 132.

The cover assembly 110, including, for example, the inner and outer sidewalls 116, 118, can include one or more port openings 183 for one or more ports 181. The port 181, which can be coupled to the PCB 132, can be used for a wired connection of the emergency communication badge 100, including the PCB 132 and/or battery 198, to another device, including a computing device. Such a connection can be utilized, for example, for a transfer of signals or information between the controller 202 (FIG. 6) of the emergency communication badge 100 and the external computing device. Additionally, or alternatively, the port 181 can be used in connection with coupling the emergency communication badge 100 to a power source, including, but not limited to, a utility power source or a computing device. Such a power source can be used to provide power to charge, or recharge, the battery 198. According to certain embodiments, the port 181 is a USB port, serial port, parallel port, VGA, DVI, HDMI, FireWire, or CAT 5, among other types of ports. Additionally, as shown in FIG. 1, according to certain embodiments, the emergency communication badge 100 can include a supplemental power supply 102 that can coupled to the port 181 to provide supplemental power to the emergency communication badge 100 and/or to the battery 198.

Figure 6:
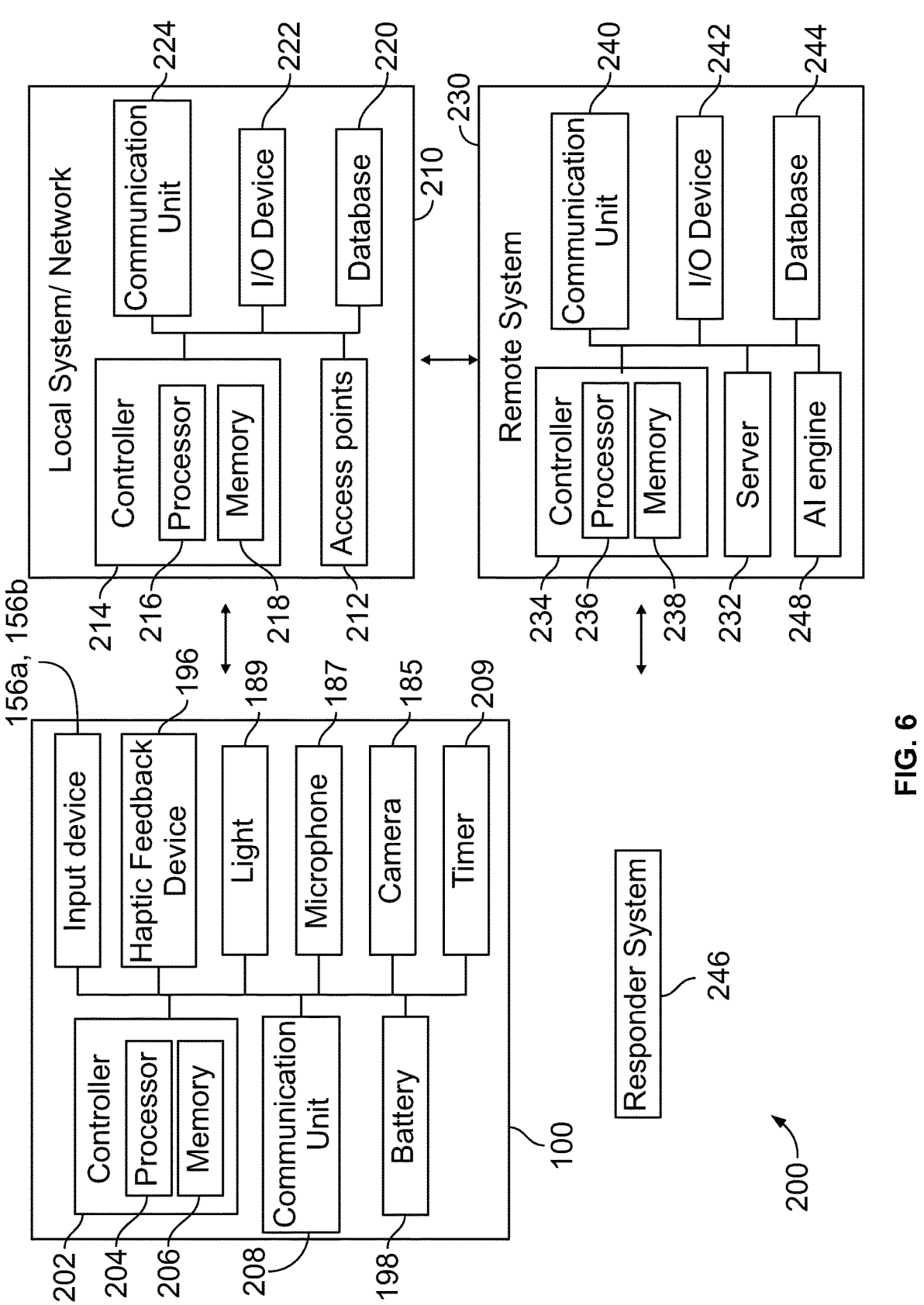
FIG. 6 illustrates a simplified block representation of an exemplary emergency communication system.

FIG. 6 illustrates a block representation of an exemplary emergency communication system 200. As seen, according to certain embodiments, the emergency communication badge 100 can include a controller 202 having at least one processor 204 and one or more memory devices 206. The controller 202 can be part of, or otherwise electrically coupled to, the PCB 132, and positioned within the interior area 124 of the cover assembly 110. The one or more processors 204 can be embodied as, or otherwise include, any type of processor, controller, or other compute circuit capable of performing various tasks such as compute functions and/or controlling the functions of the emergency communication badge 100. For example, the processor 204 may be embodied as a single or multi-core processor(s), a microcontroller, or other processor or processing/controlling circuit. In some embodiments, the processor 204 can be embodied as, include, or otherwise be coupled to an FPGA, an application specific integrated circuit (ASIC), reconfigurable hardware or hardware circuitry, or other specialized hardware to facilitate performance of the functions described herein. Additionally, in some embodiments, the processor 204 may be embodied as, or otherwise include, a high-power processor, an accelerator co-processor, or a storage controller. In some embodiments still, the processor 204 may include more than one processor, controller, or compute circuit.

The memory device 206 of the illustrative controller 202 can be embodied as any type of volatile (e.g., dynamic random access memory (DRAM), etc.) or non-volatile memory capable of storing data therein. Volatile memory may be embodied as a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used is synchronous dynamic random access memory (SDRAM).

In some embodiments, the memory device 206 can be embodied as a block addressable memory, such as those based on NAND or NOR technologies. The memory device 206 may also include future generation nonvolatile devices, such as a three dimensional crosspoint memory device (e.g., Intel 3D XPoint™ memory), or other byte addressable write-in-place nonvolatile memory devices. In some embodiments, the memory device 206 can be embodied as, or may otherwise include, chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device 206 may refer to the die itself and/or to a packaged memory product. In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance.

The badge 100 can also include a communication unit 208, which can be any type of device that allows the controller 202 of the emergency communication badge 100 to communicate with other components or devices of the emergency communication system 200. For example, the communication unit 208 can be a network adapter or network card, among other devices. Further, the communication unit 208 can be configured for wired and/or wireless communications including, for example, via proprietary and/or non-proprietary wireless communication protocols. For example, the communication unit 208 can be configured to accommodate communications via Wi-Fi, ZigBee, Bluetooth, radio, cellular, or near-field communications, as well as combinations thereof, among other communications that use other communication protocols. Additionally, or alternatively, according to certain embodiments, the communication unit 208 can comprise a transceiver. Further, the communication unit 208 can be comprised of hardware, software, and/or firmware. It is contemplated that the communication unit 208 can include more than one of these adapters, cards, or ports.

Figure 7:
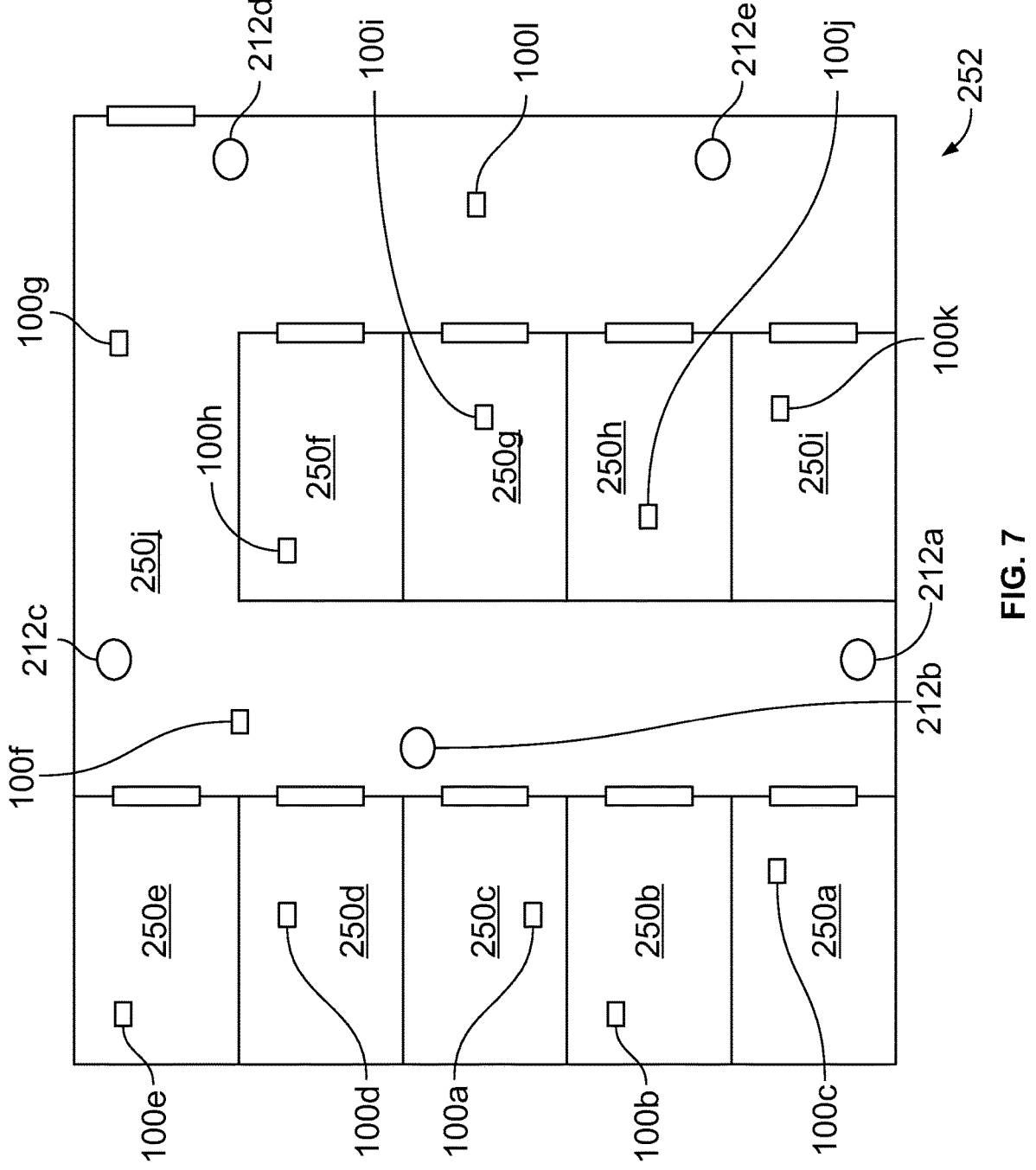
FIG. 7 illustrates a diagram of a plurality of communication badges and access points of the emergency communication system dispersed throughout an exemplary building floor.

As indicated by FIGS. 6 and 7, one or more, including a plurality, of the emergency communication badges 100 can be in communication with, or part of, a local system 210 of the emergency communication system 200. The local system 210 can include a plurality of access points 212, including wireless access points and bridges, among others, that can be part of a wireless network provided by, or accessible through, the local system 210. As indicated by FIG. 7, the access points 212 can be positioned at various positions and locations at which the emergency communication badge(s) 100 is/are present, and can assist the emergency communication badge(s) 100 with connecting to a local network that may be provided by the local system 210. The access points 212 are thus adapted to be in wireless communication with the communication unit 208 of the emergency communication badges 100, or vice versa.

The access points 212 can also be configured to provide information that can be used to determine, or estimate, the location of an emergency communication badge 100, and in particular a badge 100 that has been activated via user engagement with the first input body 156*a*, such as, for example activated via a user depressing the input body 156*a* and the associated switch 162*a* of the badge 100. For example, according to certain embodiments, the access points 212 can measure, or obtain information used to measure, a strength of a wireless signal(s), also referred to as an activation signal, received from the emergency communication badges 100 that indicates, or otherwise corresponds to, a user activating the badge 100 via use of the first input body 156*a*. Additionally, or alternatively, the access points 212 can provide information that can indicate differences in the times at which different access points 212 received the activation signal from an activated emergency communication badge 100, among other information. As discussed below, such information can be utilized to determine a location of the activated emergency communication badge 100, including either or all of: the location of the emergency communication badge 100 at the time the access point(s) 212 received the activation signal; locations of the emergency communication badge 100, including changes in location of the emergency communication badge 100, for a predetermined time period after an access point(s) 212 received the activation signal; and/or for the time period between receipt of the activation signal and the occurrence of a predetermined condition, such as, for example, receipt of a command from an operator at the local system 210 and/or a remote system 230.

The local system 210 can include a controller 214 having at least one processor 216 and a memory device 218. The processor 216 and memory device 218 can be similar to those discussed above with respect to the controller 202 of the emergency communication badge 100. The local system 210 can also include one or more databases 220. The database 220 can include a variety of information, including, but not limited to, a map of a layout or floor plans of a building(s), structure(s) or location(s) in which the access points 212 are located, as well as the associated locations of the access points 212. The database 220 can also include identification for each emergency communication badge 100, including, for example, information corresponding to the individual(s) that may be associated with a particular emergency communication badge(s) 100.

The local system 210 can also include one or more input/output (I/O) devices 222, including, for example a keyboard, display, touch screen, mouse, scanner, microphone, and speaker, as well as combinations thereof, among other I/O devices 222. The I/O device 222 can be utilized to input information to the database 220. The I/O device 222 can also be used in association with the emergency communication badge(s) 100 being connected the network provided by, or through, the local system 210 and/or a remote system 230, including, for example, registering the emergency communication badge(s) 100 with at least the remote system 230, and/or granting of permission for the emergency communication badge(s) 100 to gain access to, or otherwise communicate with, a local network provided by the local system 210.

The local system 210 can be in communication with the remote system 230 via a communication unit 224 of the local system 210. According to certain embodiments, the local system 210, such as, for example, a computing device that includes at least one of one or more processors 204 of the local system 210 that can connect, such as, for example, via the internet, to a website of the remote system 230, including, for example, a server 232 of the remote system 230. The remote system 230 can include a controller 234 having one or more processors 236, a memory device(s) 238, a communication unit 240, a I/O device(s) 242, and a database 244, each of which can be generally similar to the corresponding controller 214, processor(s) 216, memory device (s) 218, communication unit 224, I/O device(s) 222, and database 220 discussed above with respect to the local system 210. The processor 236 of the remote system 230 can, via instructions provided by the memory device 238, be used to operate the remote system 230, including the server 232, as well as store and retrieve information from the database 244, and communicate with either or both the local system 210 and a responder system 246 via the communication unit 240. Additionally, similar to the database 220 of the local system 210, the database 244 of the remote system 230 can include information regarding emergency communication badge(s) 100 that are registered with the remote system 230, including an identification of the associated user and/or associated organization of the emergency communication badge(s) 100, address information for the local system 210 and/or associated access points 212, location information for access points 212 at, or within, a particular location, building, or structure, and/or a map, room, or layout information for a particular location, building, or structure, of the location at which the access point(s) 212 are located.

The remote system 230 can also include an artificial intelligence (AI) engine 248. According to certain embodiments, the AI engine 248 is a neural network that can utilize recorded and/or stored information to improve the accuracy in identifying a location of an emergency communication badge 100 within a particular room or location. Moreover, over time, as data relating to the location of emergency communication badges 100 is accumulated, including, for example, in connection with responding to user activation of the first input body 156a, as well as in view of information provided by a database 220, 244 of the layout of the building, location, or facility at which the emergency communication badges 100 and associated access points 212 are located, the neural network of the AI engine 248 can further refine the effectiveness in the operation of the emergency communication system 200. Such improvements in refining locating activated emergency communication badges 100 can result in an improvement in the efficiency of the emergency communication system 200, including, for example, with respect to reducing the time, and/or improving the accuracy, in determining the location of an activated emergency communication badges 100. Such improvements can also result in an improvement of the responsiveness of the responders in terms of reaching the user of the activated emergency badge 100 and any associated individuals that may be in need of assistance.

For example, historical information regarding past activations of emergency communication badge(s) 100, including the associated signal strengths of the activation signals that access points 112 receive from activated emergency communication badge(s) 100, the actual location at which a responder may have located the activated emergency communication badge(s) 100 or associated individual in possession of the activated emergency communication badge(s) 100, and/or a map, floor plan, or other layout information regarding the location at which the emergency communication badge(s) 100 was activated can be used by the neural network of the AI engine 248 in connection with a pattern analysis, as well as refinement of identified patterns. Such analysis can assist the neural network of the AI engine 248 in developing and/or refining a model that can provide a prediction of the location at which an emergency communication badge 100 was activated and/or is presently located. According to certain embodiments, the neural network of the AI engine 248 can apply such data and information to one or more models, and, moreover, one or more neural network algorithms, such as, but not limited to, a multilayer perceptron (MLP), a restricted Boltzmann Machine (RBM), a convolution neural network (CNN), and/or any other neural network algorithm that will be apparent to those skilled in the relevant art(s) without departing from the spirit and scope of the disclosure.

The remote system 230 can communicate, including via the communication device 240 of the remote system 230, information regarding receipt of an activation signal to a responder system 246. Additionally, the remote system 230 can also communicate information regarding not only an address, such as a building address, at which the activated emergency communication badge 100 was detected, but also a particular location, such as, for example, a particular room, at which the emergency communication badge 100 was when the emergency communication badge 100 was activated and/or an estimated or anticipated current room or location within a building or facility at which the activated emergency communication badge 100 may be found. Additionally, the remote system 230 can also stream to the responder system 246 an audio signal or data containing sound that is/was detected by the microphone 187 of the emergency communication badge 100. Further, according to certain embodiments, the remote system 230, such as, for example, the processor 236 and associated memory device 238, can be configured such that, upon receipt of an activation signal, the remote system 230 can automatically contact the responder system 246, as well as automatically derive and communicate to the responder system 246 at least location information regarding the emergency communication badge 100. Such communication can occur in a variety of manners, including via an electronic message, automatic audio signal or call, or via an operator at the remote system 230, among other manners of communication.

The responder system 246 can take a variety forms, including, but not limited to, being a local, state, of federal emergency response and/or dispatch system. For example, according to certain embodiments, the responder system 246 can be a 911 call center, or a police, fire, and/or medical service emergency management or communication center, among other emergency responder systems.

Figure 8:
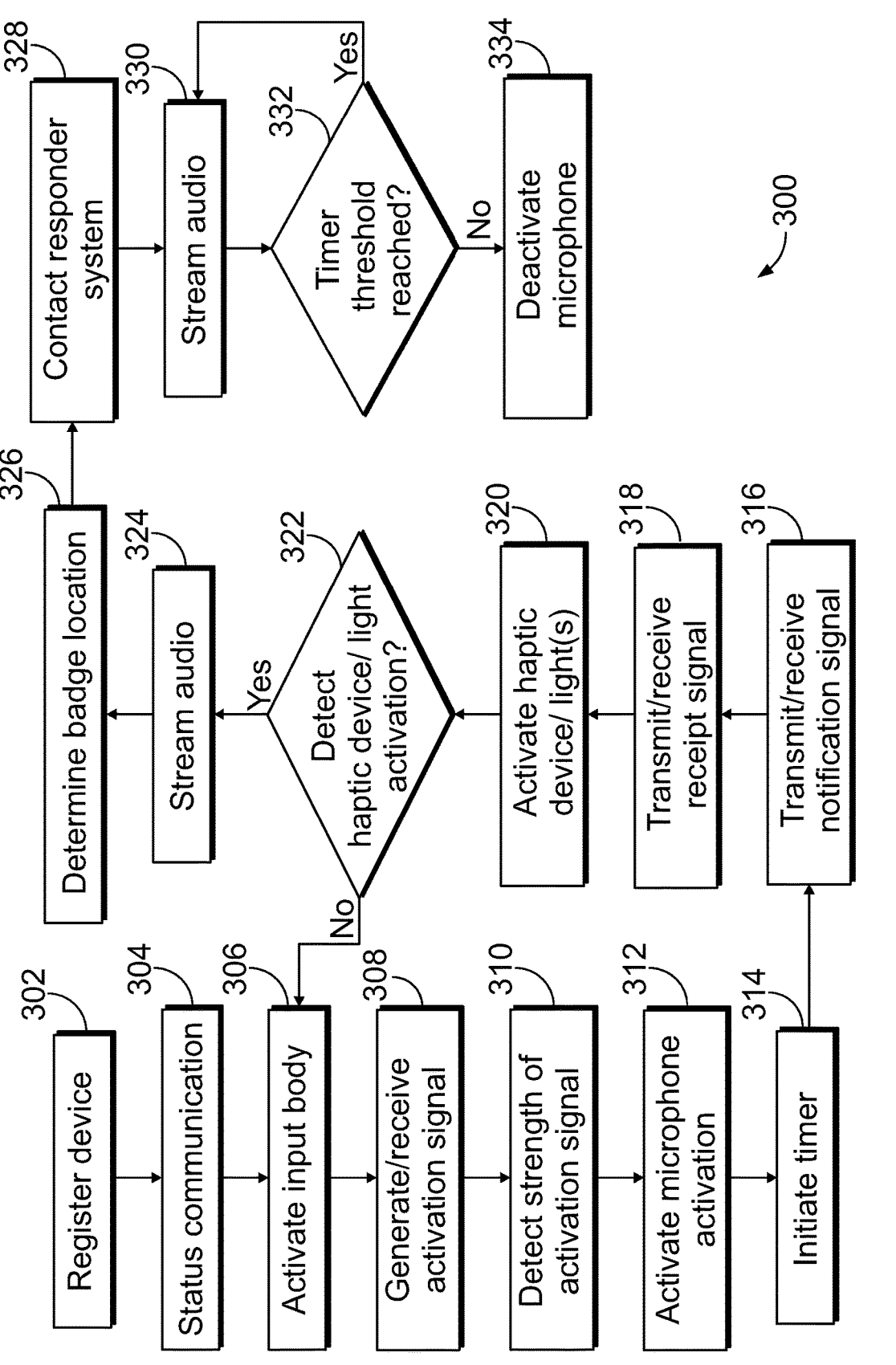
FIG. 8 illustrates a simplified flow chart of an exemplary process for utilizing the emergency communication badge.

FIG. 8 illustrates a simplified flow chart of a method 300 that can be performed by at least the emergency communication system 200 shown in FIG. 6. The method 300 corresponds to, or is otherwise associated with, performance of the blocks described below in the illustrative sequence of FIG. 8. It should be appreciated, however, that the method 300 can be performed in one or more sequences different from the illustrative sequence.

At block 302, an emergency communication badge 100 can be registered with the emergency communication system 200. For example, according to certain embodiments, the controller 214 of the local system 210 can be utilized, including via operation of the I/O device 222 of the local system 210, as well as the associated communication unit 208, to access a website or other portal of, or associate with, the remote system 230, including, for example, associated with, or accessible via, the server 232 of the remote system 230. According to certain embodiments, registration of the emergency communication badge 100 can include inputting a unique identifier associated with the particular emergency communication badge 100. Additionally according to certain embodiments, the registration of the emergency communication badge 100 can also include identifying an individual and/or organization associated with the emergency communication badge 100. Registration of the emergency communication badge 100 can also include identifying one or more locations at which the emergency communication badge 100 may be utilized.

The registering of the emergency communication badge 100 can also include connecting the emergency communication badge 100 to the network of the local system 210. For example, according to certain embodiments, the second input body 156*b* can be utilized to connect, or otherwise gain access to, the emergency communication badge 100. For example, according to the illustrated embodiment, depressing the second input body 156*b* can initiate an operation of at least the processor 204 that can place the processor 204 or other portions of the emergency communication badge 100 in a mode to search for, as well as acquire information allowing the communication badge 100 to at least periodically wirelessly connect to, an accessible network or network devices, including, for example, one or more access points 212 of the local system 210. According to certain embodiments, the status of such a search, as well as the status of an acquisition of information for connecting to, the network of the local system 210 can be communicated to a user via operation of one or more of the lights 189*a-c* of the emergency communication badge 100, including, for example, illumination, flashing, color changes, or color sequence or arrangement, of one or more of the lights 189*a-c*.

In at least an effort to conserve battery power, the emergency communication badge 100 may not be continuously connected to the network. Thus, during the ordinary course of usage of the emergency communication badge 100, in connection with a status check of the emergency communication badge 100, as indicated by block 304, the emergency communication badge 100 can at least occasionally be connected to the network for at least purposes of transmitting a status signal to the local system 210. According to certain embodiments, such a status signal can provide information regarding an operating condition of the emergency communication badge 100, including, for example, an indication of a state of charge of the battery 198, a duration of time since the battery 198 was last charged, and an estimated time period before the battery 198 may have insufficient power to operate the badge 100, among other information. Such communication of status signals can occur at either, or both, predetermined time intervals, such as, for example, every 30 days, or upon the occurrence of a trigger condition, such as, for example, activation of the second input device 156*b*, among other trigger conditions.

In certain instances, a user can activate the emergency communication badge 100 via engagement, including, for example, depression, of the user first input body 156*a*. For example, according to certain embodiments, the first input body 156*a* is a panic button, which a user can activate in response to at least a potentially or actual dangerous or emergency situation. Such activation of the first input body 156*a*, and the resulting activation of the associated switch 162*a*, can facilitate the processor 204 of the emergency communication badge 100 generating an activation signal at block 308 that is to be communicated from the communication unit 208 to at least the local network.

At block 308, the activation signal communicated by the emergency communication badge 100 can be received by one or more access points 212, and communicated to at least the processor 216 of the local system 210. As previously discussed, such receipt of the activation signal can also include the access point(s) 212 that receive(s) the activation signal detecting a strength of the received activation signal. For example, referencing the example floor plan shown in FIG. 7, activation of a first emergency communication badge 100*a* of a plurality of emergency communication badges 100*a-l* can result in one or more of a first, second, third, fourth, and fifth access point 212*a-e* detecting the activation signal. Additionally, at block 310, each access point 212*a-e* that does receive the activation signal can detect the strength of the activation signal received by that access point 212*a-e*. For example, according to embodiments in which the activation signal from the emergency communication badge 100*a* is a WiFi signal, the receiving access points 212*a-e* can determine the strength of the received activation signal using the received signal strength indicator (RSSI), milliwatts (mW), or decibels (dBm) in relation to milliwatts of the received activation signal. The receipt of the activation signal by the access point(s) 212*a-e* and the strength of the received activation signal can be communicated to the processor 216 of the local system 210. The access points 212*a-e* can also communicate other information relating to the received activation signal, including, for example a time at which the access point 212*a-e* received or otherwise detected the activation signal.

The local system 210 and/or remote system 230 can identify the particular access point(s) 212*a-e* that is/are providing an indication of receipt of the activation signal in a variety of different manners. For example, according to certain embodiments, the identity of each access point 212*a-e* be identified by using an individual basic service set identifier (BSSID), among other identifiers. Further, a record of the physical location of the access point 212*a-e*, and thus the physical location associated with the BSSID for each access point 212*a-e*, can be maintained at least in a database 220, 244 of either or both the local system 210 and the remote system 230.

According to certain embodiments, an initial strength of the activation signal received by individual access points 212*a-e* can be used in determining, including estimating, a physical location of the emergency communication badge 100. According to such an embodiment, the determination of the location of the emergency communication badge 100 can correspond to the location of the emergency communication badge 100 when the first input device 156*a* was activated, such as, for example, depressed. Additionally, or alternatively, following activation of the first input device 156*a*, the emergency communication badge 100 can, for at least a period of time, continue to communicate a signal to at least some of the access points 212*a-e*. In such a situation, the strength of the signals received by the access points 212*a-e* from the emergency communication badge 100 can continue to be used to further identify, including identify changes in, the physical location of the emergency communication badge 100. Knowledge of whether the location of the emergency communication badge 100 has changed and/or the current location of the emergency communication badge 100 can further assist responders in timely finding, and assisting, at least the user of the emergency communication badge 100.

Additionally, detection of, or receipt of a signal by, the processor 204 of the emergency communication badge 100 indicating an activation of the first input device 156*a* can result in the processor 204 activating the microphone 187, as indicated by block 312. Activation of the microphone 187 can, according to certain embodiments, be associated with the processor 204 of the emergency communication badge 100 generating a signal that facilitates the communication unit 208 transmitting an audio data signal containing audio captured by the microphone 187. According to certain embodiments, the transmitted audio data signal can be received by one or more of the access points 212*a-e*, and can be used for an audio stream that is provided to others at the local system 210, remote system 230, and/or responder system 246. Additionally, according to certain embodiments, the memory device 206 of the emergency communication badge 100, as well as the memory devices 218, 238 of at least the local system 210 and/or remote system 230, can record sounds detected by the microphone 187. Further, according to certain embodiments, activation of the microphone 187 can also be accompanied by the processor 204 initiating a timer 209 (FIG. 6), as indicated by block 314.

At block 316, the local system 210 can communicate at least a notification signal to, or for, the remote system 230 that indicates the local system 210 has received an activation signal. Moreover, the local system 210 can, in response to detecting the activation signal, alert the remote system 230 that a user has activated the emergency communication badge 100, thereby providing an indication of a potential or actual emergency. According to certain embodiments, the notification signal from the local system 210 can be sent over the internet from the communication unit 224 of the local system 210 to a website of, or accessible to, the remote system 230. The notification signal from the local system 210 can also include a variety of other information, including, for example, information identifying the particular access point(s) 212*a-e* that received the activation signal, and, optionally, the identity of access point(s) 212*a-e* that did not receive the activation signal. The notification signal can also provide information regarding the strength of the activation signal that was received by each of those identified access points 212*a-e*, as well as the time different access points 212*a-e* received the activation signal.

At block 318, in response to the remote system 230 receiving the notification signal, the remote system 230 can issue a receipt signal acknowledging the remote system 230 has received the notification signal. The receipt signal from the remote system 230 can be communicated to directly to the activated emergency communication badge 100, or indirectly, such as, for example, via the local system 210. Upon receipt of the receipt signal, the processor 208 of the activated emergency communication badge 100 can issue a signal that can facilitate an operation of one or more components of the emergency communication badge 100 in a manner that can notify the user of the activated emergency communication badge 100 that the activation of the emergency communication badge 100 has been detected. For example, according to certain embodiments, successful receipt of the notification signal by the remote system 230 can be communicated to the user via activation of the haptic feedback device 196, as indicated by block 320. Such activation can include, for example, the haptic feedback device 196 generating a force that causes vibration of the emergency communication badge 100 in a manner that can be detected by the user of the activated emergency communication badge 100. Additionally, the activation of the haptic feedback device 196 can either, or both, be for a predetermine period of time and provide a specific vibration pattern. Additionally, or alternatively, activation of the haptic feedback device 196 can coincide with illuminating one or more of the lights 189*a-c* of the activated emergency communication badge 100*a*.

The absence of the operation of the feedback device 196 and/or an associated illumination of one or more of the lights 189*a-c* may provide an indication to the user of the emergency communication badge 100 that the activation of the emergency communication badge 100 was not detected, and/or that the first input device 156*a* was not properly activated, such as, for example, sufficiently depressed. Thus, as indicated by block 322, according to the illustrated embodiment, a determination by a user of the emergency communication badge 100 that the user has not detected anything to indicate an operation of the haptic feedback device or the anticipated illumination of the lights 189*a-c* can trigger the user to reactivate the first input body 156*a*. Moreover, the absence of detection of operation of the haptic feedback device 196, and any associated illumination of the lights 189*a-c*, can indicate to the user that the activation signal was undetected, and/or the remote system 230 may be unaware, or failed to recognize, the user's prior activation of the first input device 156*a*. Thus, reactivation of the first input body 156*a* again at block 306 can reinitiate the transmissions and receipts of the activation, notification, and receipt signals, as well as the associated activities, discussed above with respect to at least blocks 308, 310, 312, 314, 316, 318, and 320.

At block 324, data containing audio being captured by the microphone 187 can be communicated to the local system 210 and/or the remote system 230, which may provide information regarding the nature of the apparent emergency, and/or information regarding the reason(s) that the user activated the first input body 156*a* at block 306. According to certain embodiments, such audio communication may be in one-direction. More specifically, while audio can be provided from the activated emergency communication badge 100*a* to other portions of the emergency communication system 200, the activated emergency communication badge 100 may not receive and play audio from other portions of the emergency communication system 200. Thus, according to certain embodiments, the emergency communication badges 100*a-l* may not include a speaker. Such one-way audio communication may be intended to assist in the safety of the user who activated the emergency communication badge 100, as with at least certain types of dangerous situations the user may be hiding or otherwise avoiding detection. Additionally, in certain situations, the user may wish to prevent or minimize any indication that responding authorities, responders, or other emergency personnel have been notified of the current danger or emergency. Further, while the foregoing is discussed with respect to a microphone 187, the emergency communication badge 100 can also include a camera 185 that may be operated in a manner similar to that discussed herein with respect to the microphone. Thus, in addition to, or in lieu of transmitting data containing sounds captured by the microphone 187, according to certain embodiments, the emergency communication badge 100 can similarly transmit images or video captured by the camera 185.

At block 326, the emergency communication system 200 can determine or estimate a location of the activated emergency communication badge 100. As previously discussed, such estimation can be based on information received by the access points 212a-e from the activated emergency communication badge 100. For example, as discussed above, such information can include the strength of the activation signal (s) received by one or more of the access points 212a-e from the emergency communication badge 100a, and/or differences in times at which different access points 212a-e received the activation signal(s), as well as via recorded information regarding the physical locations of the access points 212a-e, as may be maintained in one or more databases 220, 244. Additionally, determining the location at which the activated emergency communication badge 100 was/is present can also involve use of recorded floor plans having the layout or of the associated building or facility 252 (FIG. 7), including, but not limited to, the location of particular rooms 250a-j (FIG. 7) relative to the physical locations of the access points 212a-e that detected the activation signal. A variety of different techniques can also be utilized by the local system 210 and/or remote system 230, including the associated controller 214, 234 and processor(s) 216, 236, in connection with determining the location of the activated emergency communication badge 100, including, but not limited to, triangulation, trilateration, and/or via the AI engine 248, among other approaches. Again, such approaches can, for example, utilize information from the access points 212a-e, including the strength of the received activation signal, and/or differences in the time different access points 212a-e received the activation, signal, the physical location of the access points a-e, and/or the layout of the building or facility at which the badge 100 is located.

At block 328, the remote system 230, or an operator at the remote system 230, can contact the responder system 246. Such contact can include providing a determined location within a particular building or facility at which the activated emergency communication badge 100 was and/or is located, as determined at block 326. Further, as indicated by block 330, such contact with the responder system 246 can include the remote system 230 providing the responder system 246 with a stream and/or recording of audio and/or video that was, and/or is currently being, obtained via operation of the microphone 187 and/or camera 185, as discussed above with respect to blocks 312 and 324.

At block 332, the processor 204 of the activated emergency communication badge 100 can determine whether the timer 209 that was activated at block 314 has reached a predetermined timer threshold. The predetermined timer 209 threshold may be a time at which information can be obtained via operation of the microphone 187 and/or the camera 185 so as to provide at least a general indication of the nature of the emergency or danger, but also prevent operation of the microphone 187 and/or camera 185 from depleting the power of the rechargeable battery 198. Thus, for example, the predetermined timer threshold can be approximately 30 minutes, among other time periods. If a determination is made at block 332 that the timer 209 has not yet reached the predetermined timer threshold, then microphone 187 and/or camera 185 can continue operating to gain audio/video that can be streamed, or otherwise recorded. Otherwise, if the timer 209 has reached the predetermined timer threshold, then at block 334 the microphone 187 and, if being operated, the camera 185, can be deactivated.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. An emergency communication badge configured to be coupled to a user of the emergency communication badge, the emergency communication badge comprising:
   a haptic feedback device;
   a first input;
   a microphone;
   a communication unit;
   at least one processor; and
   a memory device coupled to the at least one processor, the memory device including instructions that when executed by the at least one processor cause the at least one processor to:
   detect an activation of the first input,
   instruct, in response to detection of the activation of the first input, the communication unit to wirelessly transmit an activation signal from the emergency communication badge,
   activate, in response to the detection of the activation of the first input, and for a predetermined time period, operation of the microphone,
   instruct, in response to a receipt by the communication unit of a receipt signal corresponding to an acknowledgement of a detection of the activation signal that was wirelessly transmitted from the emergency communication badge, activation of the haptic feedback device, and
   instruct the communication unit to stream, during the predetermined time period, an audio data signal, the audio data signal including data of sounds captured by the microphone during the predetermined time period,
   wherein the memory device further includes instructions that when executed by the at least one processor cause the at least one processor to:
   wirelessly connect, at predetermined time periods, and via use of at least the communication unit, the emergency communication badge to a local network,
   issue, upon connection to the local network, a status signal for transmission from the emergency communication badge, and
   terminate, in response to at least the transmission of the status signal from the emergency communication badge, the wireless connection of the emergency communication badge to the local network.

2. The emergency communication badge of claim 1, wherein the memory device further includes instructions that when executed by the at least one processor cause the at least one processor to:
   determine a state of charge of a battery of the emergency communication badge, and instruct that information regarding the state of charge of the battery be included with the status signal.

3. The emergency communication badge of claim 1, further comprising at least one light, and wherein the memory device further includes instructions that when executed by the at least one processor cause the at least one processor to illuminate the at least one light in response to the receipt by the communication unit of the receipt signal.

4. The emergency communication badge of claim 1, wherein the haptic feedback device is configured to generate a vibratory force, and wherein the haptic feedback device is positioned for transmission of the vibratory force directly to a cover assembly of the emergency communication badge.

5. The emergency communication badge of claim 1, further including a cover assembly, the cover assembly including at least one attachment body, the at least one attachment body being configured for engagement with an attachment means that couples the emergency communication badge to the user.

6. The emergency communication badge of claim 5, wherein the cover assembly includes an interior area, and wherein the microphone, the communication unit, the at least one processor, and the memory device are positioned within the interior area.

7. The emergency communication badge of claim 6, wherein at least a portion of the first input extends from the interior area and into at least a portion of a first opening of the cover assembly.

8. The emergency communication badge of claim 7, further including a second input, wherein at least a portion of the second input extends from the interior area and into at least a portion of a second opening of the cover assembly, the first opening being larger than the second opening, at least a portion of the first input and at least a portion of the second input each being part of an inner membrane, the inner membrane extending over both a first switch of the first input and a second switch of the second input.

9. The emergency communication badge of claim 8, wherein the first input is positioned along an outer edge of the cover assembly and the second input is positioned in a corner of the cover assembly.

10. The emergency communication badge of claim 1, further including a port, a printed circuit board, and a cover assembly, the port being accessible through a port opening in a sidewall of the cover assembly, the printed circuit board being housed within an interior area of the cover assembly and electrically coupled to at least the port.

11. The emergency communication badge of claim 10, further including a supplemental power supply configured to be electrically coupled to the port, the supplemental power supply configured to provide electrical power to at least partially recharge a battery of the emergency communication badge.

12. The emergency communication badge of claim 1, wherein the receipt signal is an acknowledgement of a remote system receiving a notification of a detection of the activation signal that was transmitted from the emergency communication badge.

13. An emergency communication badge configured to be coupled to a user of the emergency communication badge, the emergency communication badge comprising:
a haptic feedback device;
a first input;
a microphone;
a communication unit;
a second input
at least one processor; and
a memory device coupled to the at least one processor, the memory device including instructions that when executed by the at least one processor cause the at least one processor to:
detect an activation of the first input,
instruct, in response to detection of the activation of the first input, the communication unit to wirelessly transmit an activation signal from the emergency communication badge, activate, in response to the detection of the activation of the first input, and for a predetermined time period, operation of the microphone,
instruct, in response to a receipt by the communication unit of a receipt signal corresponding to an acknowledgement of a detection of the activation signal that was wirelessly transmitted from the emergency communication badge, activation of the haptic feedback device,
instruct the communication unit to stream, during the predetermined time period, an audio data signal, the audio data signal including data of sounds captured by the microphone during the predetermined time period,
detect an activation of the second input, and
detect, in response to detected of the activation of the second input, and via use of at least the communication unit, a network to which the emergency communication badge can wirelessly connect.

14. An emergency communication badge configured to be coupled to a user of the emergency communication badge, the emergency communication badge comprising:
a haptic feedback device;
a first input;
a microphone;
a communication unit;
at least one processor; and
a memory device coupled to the at least one processor, the memory device including instructions that when executed by the at least one processor cause the at least one processor to:
detect an activation of the first input,
instruct, in response to detection of the activation of the first input, the communication unit to wirelessly transmit an activation signal from the emergency communication badge,
activate, in response to the detection of the activation of the first input, and for a predetermined time period, operation of the microphone,
instruct, in response to a receipt by the communication unit of a receipt signal corresponding to an acknowledgement of a detection of the activation signal that was wirelessly transmitted from the emergency communication badge, activation of the haptic feedback device, and
instruct the communication unit to stream, during the predetermined time period, an audio data signal, the audio data signal including data of sounds captured by the microphone during the predetermined time period,
wherein the emergency communication badge does not include a speaker.

15. An emergency communication badge configured to be coupled to a user of the emergency communication badge, the emergency communication badge comprising:
a haptic feedback device;
a first input;
a microphone;
a communication unit;
a camera;
at least one processor; and
a memory device coupled to the at least one processor, the memory device including instructions that when executed by the at least one processor cause the at least one processor to:
detect an activation of the first input, instruct, in response to detection of the activation of the first input, the communication unit to wirelessly transmit an activation signal from the emergency communication badge, activate, in response to the detection of the activation of the first input, and for a predetermined time period, operation of the microphone, instruct, in response to a receipt by the communication unit of a receipt signal corresponding to an acknowledgement of a detection of the activation signal that was wirelessly transmitted from the emergency communication badge, activation of the haptic feedback device, instruct the communication unit to stream, during the predetermined time period, an audio data signal, the audio data signal including data of sounds captured by the microphone during the predetermined time period, and transmit, during the predetermined time period, an image data signal, the image data signal including one or more images or video captured by the camera during the predetermined time period.

16. An emergency communication badge configured to be coupled to a user of the emergency communication badge, the emergency communication badge comprising:

a haptic feedback device;

a first input;

a microphone;

a communication unit;

at least one processor; and a memory device coupled to the at least one processor, the memory device including instructions that when executed by the at least one processor cause the at least one processor to:

detect an activation of the first input, instruct, in response to detection of the activation of the first input, the communication unit to wirelessly transmit an activation signal from the emergency communication badge, activate, in response to the detection of the activation of the first input, and for a predetermined time period, operation of the microphone, instruct, in response to a receipt by the communication unit of a receipt signal corresponding to an acknowledgement of a detection of the activation signal that was wirelessly transmitted from the emergency communication badge, activation of the haptic feedback device, and instruct the communication unit to stream, during the predetermined time period, an audio data signal, the audio data signal including data of sounds captured by the microphone during the predetermined time period, wherein the haptic feedback device is configured to generate a vibratory force, and wherein the haptic feedback device is positioned for transmission of the vibratory force directly to a cover assembly of the emergency communication badge, and wherein the haptic feedback device is positioned in a cavity in an interior area of the cover assembly of the emergency communication badge, the cavity being between a bottom wall of a printed circuit board and a wall of the cover assembly.

17. The emergency communication badge of claim 16, further including a second input, at least a portion of the first input and at least a portion of the second input each being part of an inner membrane, the inner membrane extending within the interior area over both a first switch of the first input body and a second switch of the second input.

18. An emergency communication badge configured to be coupled to a user of the emergency communication badge, the emergency communication badge comprising:

a haptic feedback device;

a first input;

a microphone;

a communication unit;

a timer;

at least one processor; and a memory device coupled to the at least one processor, the memory device including instructions that when executed by the at least one processor cause the at least one processor to:

detect an activation of the first input, instruct, in response to detection of the activation of the first input, the communication unit to wirelessly transmit an activation signal from the emergency communication badge, activate, in response to the detection of the activation of the first input, and for a predetermined time period, operation of the microphone, instruct, in response to a receipt by the communication unit of a receipt signal corresponding to an acknowledgement of a detection of the activation signal that was wirelessly transmitted from the emergency communication badge, activation of the haptic feedback device, instruct the communication unit to stream, during the predetermined time period, an audio data signal, the audio data signal including data of sounds captured by the microphone during the predetermined time period;

instruct, in response to the detection of the activation of the first input, an activation of the timer, and detect, using information from the timer, an expiration of the predetermined time period.

19. An emergency communication badge configured to be coupled to a user of the emergency communication badge, the emergency communication badge comprising:

a haptic feedback device;

a first input;

a microphone;

a communication unit;

at least one processor; and a memory device coupled to the at least one processor, the memory device including instructions that when executed by the at least one processor cause the at least one processor to:

detect an activation of the first input, instruct, in response to detection of the activation of the first input, the communication unit to wirelessly transmit an activation signal from the emergency communication badge, activate, in response to the detection of the activation of the first input, and for a predetermined time period, operation of the microphone, instruct, in response to a receipt by the communication unit of a receipt signal corresponding to an acknowledgement of a detection of the activation signal that was wirelessly transmitted from the emergency communication badge, activation of the haptic feedback device, and instruct the communication unit to stream, during the predetermined time period, an audio data signal, the audio data signal including data of sounds captured by the microphone during the predetermined time period, wherein the acknowledgement indicates a website of a remote system received the notification of the detection of the activation signal.

* * * * *